United States Patent
Benantar et al.

(10) Patent No.: US 6,854,056 B1
(45) Date of Patent: Feb. 8, 2005

(54) METHOD AND SYSTEM FOR COUPLING AN X.509 DIGITAL CERTIFICATE WITH A HOST IDENTITY

(75) Inventors: Messaoud Benantar, Austin, TX (US); Thomas L. Gindin, Potomac, MD (US); Ivan Milman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 09/667,090

(22) Filed: Sep. 21, 2000

(51) Int. Cl.[7] ............................ H04L 9/00; G06F 11/30
(52) U.S. Cl. ...................... 713/156; 713/155; 713/168; 713/182; 713/201; 380/282; 709/227; 709/229
(58) Field of Search ................................. 713/156, 155, 713/168, 172, 182, 201, 186; 382/116; 709/227, 229; 380/30, 282, 285

(56) References Cited

U.S. PATENT DOCUMENTS

| | | | |
|---|---|---|---|
| 4,868,877 A | * | 9/1989 | Fischer ........................ 713/157 |
| 5,241,594 A | | 8/1993 | Kung ............................. 380/4 |
| 5,371,794 A | * | 12/1994 | Diffie et al. ................. 713/156 |
| 5,455,953 A | | 10/1995 | Russell ........................ 395/739 |
| 5,535,276 A | | 7/1996 | Ganesan ....................... 380/25 |
| 5,712,914 A | * | 1/1998 | Aucsmith et al. ............. 380/30 |
| 5,774,552 A | * | 6/1998 | Grimmer ..................... 713/156 |
| 5,790,785 A | | 8/1998 | Klug et al. ............. 395/188.01 |
| 5,815,574 A | | 9/1998 | Fortinsky ..................... 380/25 |
| 5,832,211 A | | 11/1998 | Blakley, III et al. .... 395/188.01 |
| 5,841,970 A | | 11/1998 | Tabuki ................... 395/187.01 |
| 5,982,898 A | * | 11/1999 | Hsu et al. ..................... 713/156 |
| 6,005,939 A | | 12/1999 | Fortenberry et al. .......... 380/21 |
| 6,026,166 A | * | 2/2000 | LeBourgeois ............... 713/156 |
| 6,189,097 B1 | * | 2/2001 | Tycksen et al. ............. 713/156 |
| 6,230,266 B1 | * | 5/2001 | Perlman et al. ............. 713/158 |
| 6,233,577 B1 | * | 5/2001 | Ramasubramani et al. .... 707/9 |
| 6,301,658 B1 | * | 10/2001 | Koehler ...................... 713/155 |
| 6,321,333 B1 | * | 11/2001 | Murray ....................... 713/156 |
| 6,324,645 B1 | * | 11/2001 | Andrews et al. ............ 713/157 |
| 6,341,351 B1 | * | 1/2002 | Muralidhran et al. ....... 713/201 |
| 6,405,313 B1 | * | 6/2002 | Reiter et al. ................ 713/156 |
| 6,553,493 B1 | * | 4/2003 | Okumura et al. ........... 713/170 |
| 6,564,320 B1 | * | 5/2003 | de Silva et al. ............ 713/156 |
| 6,584,565 B1 | * | 6/2003 | Zamek ....................... 713/156 |

* cited by examiner

Primary Examiner—Emmanuel L. Moise
(74) Attorney, Agent, or Firm—Jeffrey S. LaBaw; Joseph R. Burwell

(57) ABSTRACT

A method or system is presented for coupling identities through the use of digital certificates, thereby allowing a client to be authenticated for a variety of services without those services having to modify their existing methods of authentication. The client generates a request for a digital certificate containing its host identity for a targeted host and secret data associated with its host identity. The secret data has been encrypted using the public key of the certifying authority that receives the request for the digital certificate. The certifying authority decrypts the secret data using its private key and encrypts the secret data using the public key of the targeted host. The digital certificate is then generated and returned to the client. At some point in time, a host receives the certificate from the client and obtains the client's host identity from the certificate, i.e. the host identity uniquely identifies the client or the user of the client to the host. Encrypted secret data associated with the host identity, such as a password, is also retrieved from the digital certificate. The host decrypts the secret data with its private key, and the host then authenticates the client using the host identity and the decrypted secret data for various services. The digital certificate may be formatted according to the X.509 standard, and the host identity and secret information may be stored in an X.509 extension within the digital certificate.

40 Claims, 7 Drawing Sheets

```
HostIdMapping    ::=    SEQUENCE  {
       hostName         [1]    IMPLICIT    IA5String,
       subjectID               IMPLICIT    IA5String,
       proofOfIdPossession             IdProof OPTIONAL  }

IdProof   ::=  SEQUENCE  {
       secret                  OCTET STRING,
       encryptionAlgorithm OBJECT IDENTIFIER   }
```

```
Certificate      ::=  SEQUENCE   {
      tbsCertificate           TBSCertificate,
      signatureAlgorithm       AlgorithmIdentifier,
      signature                BIT STRING   }

TBSCertificate   ::=   SEQUENCE  {
      version              [0]  Version DEFAULT v1,
      serialNumber              CertificateSerialNumber,
      signature                 AlgorithmIdentifier,
      issuer                    Name,
      validity                  Validity,
      subject                   Name,
      subjectPublicKeyInfo      SubjectPublicKeyInfo,
      issuerUniqueID       [1]  IMPLICIT UniqueIdentifier OPTIONAL,
      subjectUniqueID      [2]  IMPLICIT UniqueIdentifier OPTIONAL,
      extensions           [3]  Extensions OPTIONAL    }

Version   ::=  INTEGER   {  v1(0), v2(1), v3(2)   }

CertificateSerialNumber   ::=  INTEGER

Validity ::= SEQUENCE {
      notBefore                 Time,
      notAfter                  Time }

Time  ::= CHOICE {
      utcTime                   UTCTime,
      generalTime               GeneralizedTime }

UniqueIdentifier   ::=  BIT STRING

SubjectPublicKeyInfo   ::=  SEQUENCE   {
      algorithm                 AlgorithmIdentifier,
      subjectPublicKey          BIT STRING   }

Extensions   ::=  SEQUENCE SIZE (1..MAX) OF Extension

Extension   ::=  SEQUENCE  {
      extnID                    OBJECT IDENTIFIER,
      critical                  BOOLEAN DEFAULT FALSE,
      extnValue                 OCTET STRING   }
```

*FIG. 5*

*(PRIOR ART)*

METHOD AND SYSTEM FOR COUPLING AN X.509 DIGITAL CERTIFICATE WITH A HOST IDENTITY

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer authentication.

2. Description of Related Art

The commercial use of the Internet has dramatically increased the use of technology. During the early adoption of the Internet for commercial use, one would frequently learn of enterprises that were moving legacy applications to the World Wide Web or introducing Internet functionality into these legacy applications. Web-based and Internet-based applications have now become so commonplace that when one learns of a new product or service, one assumes that the product or service will incorporate Internet functionality into the product or service. New applications that incorporate significant proprietary technology are only developed when an enterprise has a significantly compelling reason for doing so.

Many corporations have employed proprietary data services for many years, but it is now commonplace to assume that individuals and small enterprises also have access to digital communication services. Many of these services are or will be Internet-based, and the amount of electronic communication on the Internet is growing exponentially.

One of the factors influencing the growth of the Internet is the adherence to open standards for much of the Internet infrastructure. Individuals, public institutions, and commercial enterprises alike are able to introduce new content, products, and services that are quickly integrated into the digital infrastructure because of their ability to exploit common knowledge of open standards.

Concerns about the integrity and privacy of electronic communication have also grown with adoption of Internet-based services. Various encryption and authentication technologies have been developed to protect electronic communication. For example, an open standard promulgated for protecting electronic communication is the X.509 standard for digital certificates.

An X.509 digital certificate is an International Telecommunications Union (ITU) standard that has been adopted by the Internet Engineering Task Force (IETF) body. It cryptographically binds the certificate holder, presumably the subject name that the certificate contains, with its public cryptographic key. This cryptographic binding is based on the involvement of a trusted entity in the Internet Public Key Infrastructure (PKIX) called the "Certifying Authority". As a result, a strong and trusted association between the certificate holder and its public key can become public information yet remain tamper-proof and reliable.

An important aspect of this reliability is a digital signature that the Certifying Authority stamps on a certificate before it is released for use. Subsequently, whenever the certificate is presented to a system for use of a service, its signature is verified before the subject holder is authenticated. After the authentication process is successfully completed, the certificate holder may be provided access to certain information and/or services.

Many legacy systems have been updated with open standard functionality, such as X.509 certificates, so that system services are widely available yet secure. Although an updated legacy system may be more conveniently accessed through the Internet or through a corporate intranet, there may be justifiable reasons for not modifying certain systems. Hence, many enterprises have legacy systems that are being maintained but not updated with new technologies.

Most legacy systems ensure secure access through the use of a password or other secret or secure information, such as biometric identifiers, that must be simultaneously asserted along with a user's identity. Since an individual may have many identities on different legacy systems, legacy systems are relatively inconvenient to use. The methodology of securing access to legacy systems can present barriers to enterprise-wide goals of enhancing efficiency and workflow compared with newer or updated interconnected systems that employ open standards for authentication.

Therefore, it would be advantageous to have a method and system in which secure user access to a legacy system could be provided through an interconnected system without the necessity of modifying the legacy system. It would be particularly advantageous to use the trusted relationships associated with digital certificates in order to authenticate user access to these legacy systems.

SUMMARY OF THE INVENTION

The present invention is a method or system for coupling identities through the use of digital certificates, thereby allowing a client to be authenticated for a variety of services without those services having to modify their existing methods of authentication.

The client generates a request for a digital certificate containing its host identity for a targeted host and secret data associated with its host identity. The secret data has been encrypted using the public key of the certifying authority that receives the request for the digital certificate. The certifying authority decrypts the secret data using its private key and encrypts the secret data using the public key of the targeted host. The digital certificate is then generated and returned to the client.

A host receives the digital certificate from the client and obtains the client's host identity from the digital certificate, i.e. the host identity uniquely identifies the client or the user of the client to the host. Encrypted secret data associated with the host identity, such as a password, is also retrieved from the digital certificate. During an authentication process, the secret data securely associates the host identity with the entity that presents the host identity. The host decrypts the secret data with its private key, and the host then authenticates the client using the host identity and the decrypted secret data for various services. The digital certificate may be formatted according to the X.509 standard, and the host identity and secret information may be stored in an X.509 extension within the digital certificate.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 5 shows some of the fields of a standard X.509 digital certificate;

DETAILED DESCRIPTION OF THE INVENTION

Figure 1A:
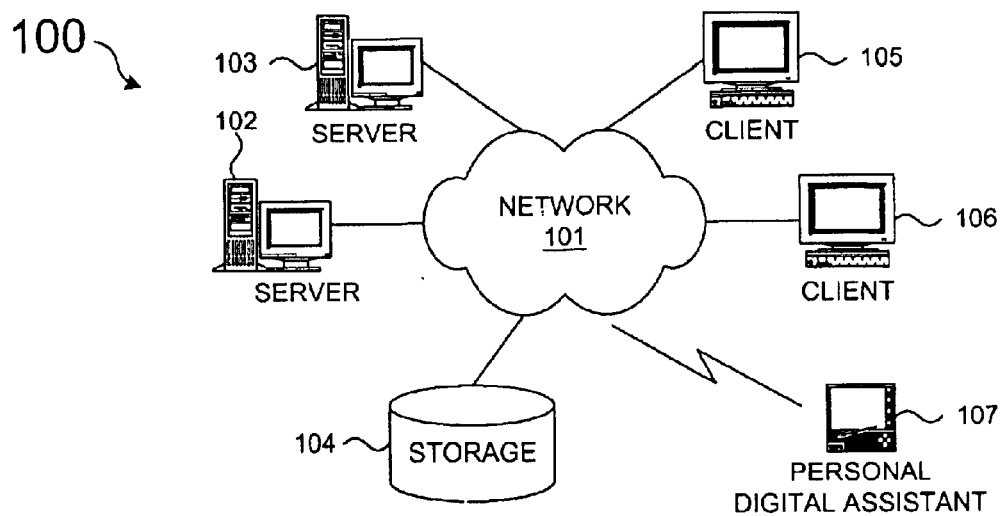
FIG. 1A depicts a typical distributed data processing system in which the present invention may be implemented.

With reference now to the figures, FIG. 1A depicts a typical network of data processing systems. Each of the data processing systems shown in FIG. 1A may implement the present invention. Distributed data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also include a number of different types of networks, such as, for example, an intranet, a local area network (LAN), or a wide area network (WAN).

The present invention could be implemented on a variety of hardware platforms. FIG. 1A is intended as an example of a heterogeneous computing environment and not as an architectural limitation for the present invention.

Figure 1B:
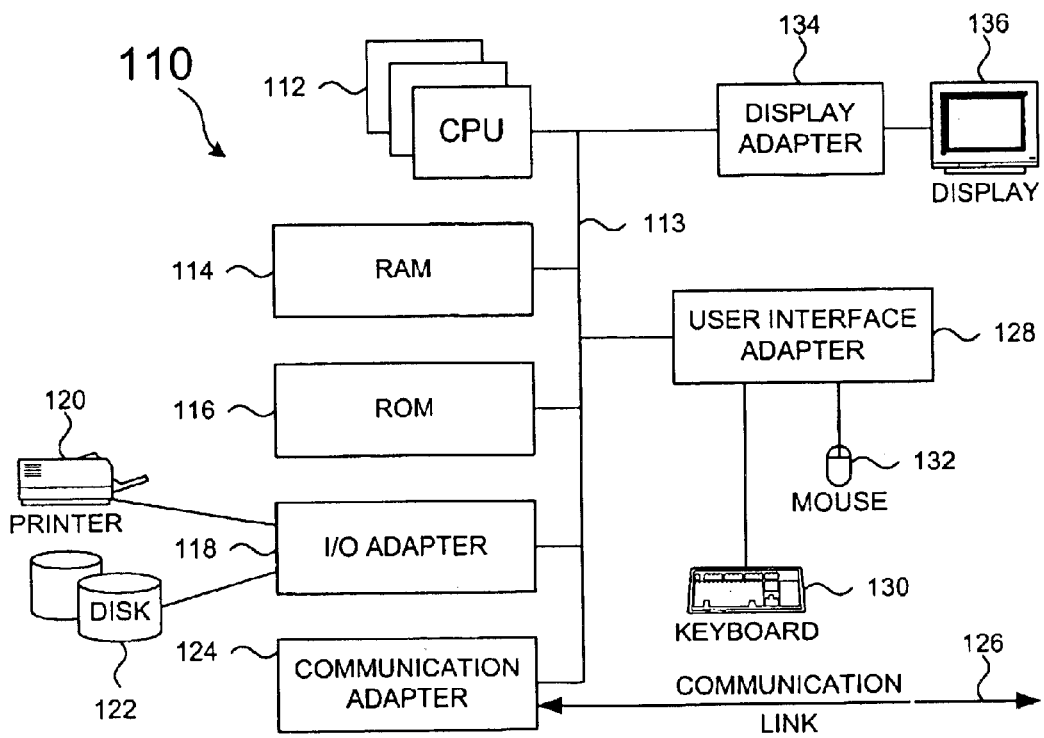
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 110 contains one or more central processing units (CPUs) 112 connected to internal system bus 113, which interconnects random access memory (RAM) 114, read-only memory 116, and input/output adapter 118, which supports various I/O devices, such as printer 120, disk units 122, or other devices not shown, such as a sound system, etc. System bus 113 also connects communication adapter 124 that provides access to communication link 126. User interface adapter 128 connects various user devices, such as keyboard 130 and mouse 132, or other devices not shown, such as a touch screen, stylus, etc. Display adapter 134 connects system bus 113 to display device 136.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention. In addition to being able to be implemented on a variety of hardware platforms, the present invention may be implemented in a variety of software environments. A typical operating system may be used to control program execution within the data processing system.

The present invention may be implemented on a variety of hardware and software platforms, as described above. More specifically, though, the present invention is directed to providing an identity mapping methodology that secures user access to applications or systems within a distributed data processing environment. To accomplish this goal, the present invention uses the trusted relationships associated with digital certificates in a novel manner to authenticate user access for an application or system. Before describing the present invention in more detail, though, some background information about digital certificates is provided for evaluating the operational efficiencies and other advantages of the present invention.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical public key cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key to encrypt data, and the receiver uses a private key to decrypt the encrypted message.

When authenticating data, data can be signed by computing a digital signature from the data and the private key of the signer. Once the data is digitally signed, it can be stored with the identity of the signer and the signature that proves that the data originated from the signer. A signer uses a private key to sign data, and a receiver uses the public key to verify the signature. The present invention is directed to a form of authentication using digital certificates; some encryption is also performed during the processing within the present invention.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction, that is trusted to sign or issue certificates for other people or entities. The CA usually has some kind of legal responsibilities for its vouching of the binding between a public key and its owner that allow one to trust the entity that signed a certificate. There are many such certificate authorities, such as VeriSign, Entrust, etc. These authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a company like VeriSign that provides trusted third-party certificate authority services. The certificate authority will then generate the certificate and return it. The certificate may contain other information, such as dates during which the certificate is valid and a serial number. One part of the value provided by a certificate authority is to serve as a neutral and trusted introduction service, based in part on their verification requirements, which are openly published in their Certification Service Practices (CSP).

Typically, after the CA has received a request for a new digital certificate, which contains the requesting entity's public key, the CA signs the requesting entity's public key with the CA's private key and places the signed public key within the digital certificate. Anyone who receives the digital certificate during a transaction or communication can then use the public key of the CA to verify the signed public key within the certificate. The intention is that an entity's certificate verifies that the entity owns a particular public key.

The X.509 standard is one of many standards that defines the information within a certificate and describes the data format of that information. The "version" field indicates the X.509 version of the certificate format with provision for future versions of the standard. This identifies which version of the X.509 standard applies to this certificate, which affects what information can be specified in it. Thus far, three versions are defined. Version 1 of the X.509 standard for public key certificates was ratified in 1988. The version 2 standard, ratified in 1993, contained only minor enhancements to the version 1 standard. Version 3, defined in 1996, allows for flexible extensions to certificates in which certificates can be extended in a standardized and generic fashion to include additional information.

In addition to the traditional fields in public key certificates, i.e. those defined in versions 1 and 2 of X.509, version 3 comprises extensions referred to as "standard extensions". The term "standard extensions" refers to the fact that the version 3 of the X.509 standard defines some broadly applicable extensions to the version 2 certificate. However, certificates are not constrained to only the standard extensions, and anyone can register an extension with the appropriate authorities. The extension mechanism itself is completely generic.

Other aspects of certificate processing are also standardized. The Certificate Request Message Format (RFC 2511) specifies a format recommended for use whenever a relying party is requesting a certificate from a CA. Certificate Management Protocols have also been promulgated for transferring certificates. More information about the X.509 public key infrastructure (PKIX) can be obtained from the Internet Engineering Task Force (IETF) at www.ietf.org.

Figure 2:
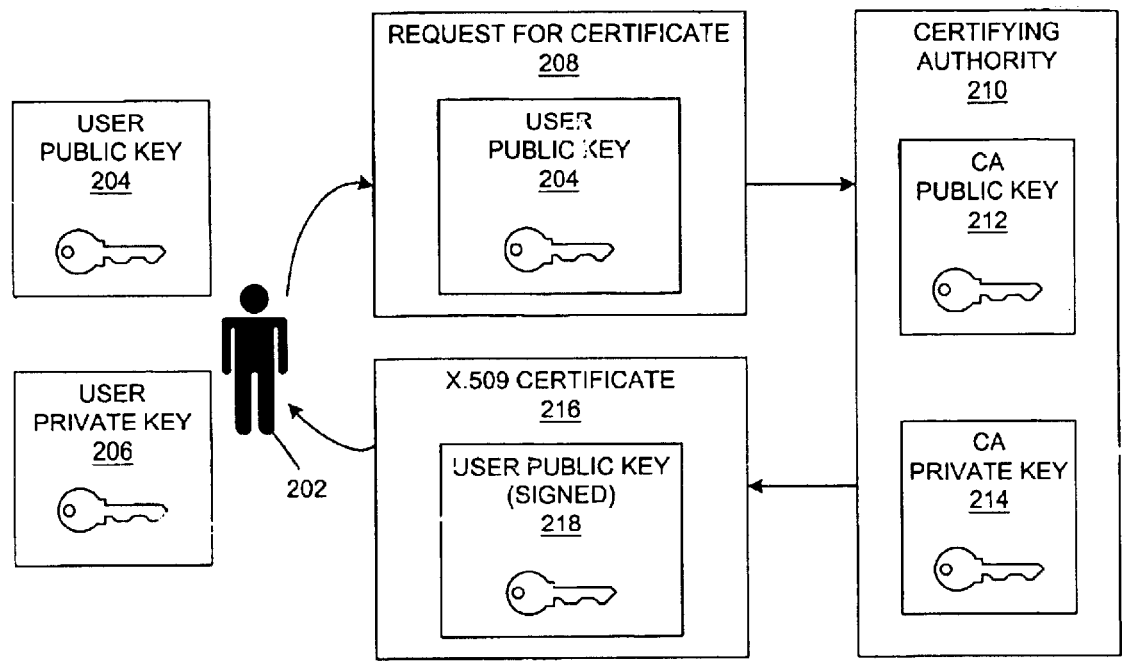
FIG. 2 depicts a typical manner in which an entity obtains a digital certificate.

With reference now to FIG. 2, a block diagram depicts a typical manner in which an individual obtains a digital certificate. User 202, operating on some type of client computer, has previously obtained or generated a public/private key pair, e.g., user public key 204 and user private key 206. User 202 generates a request for certificate 208 containing user public key 204 and sends the request to certifying authority 210, which is in possession of CA public key 212 and CA private key 214. Certifying authority 210 verifies the identity of user 202 in some manner and generates X.509 digital certificate 216 containing signed user public key 218 that was signed with CA private key 214. User 202 receives newly generated digital certificate 216, and user 202 may then publish digital certificate 216 as necessary to engage in trusted transactions or trusted communications. An entity that receives digital certificate 216 may verify the signature of the CA by using CA public key 212, which is published and available to the verifying entity.

Figure 3:
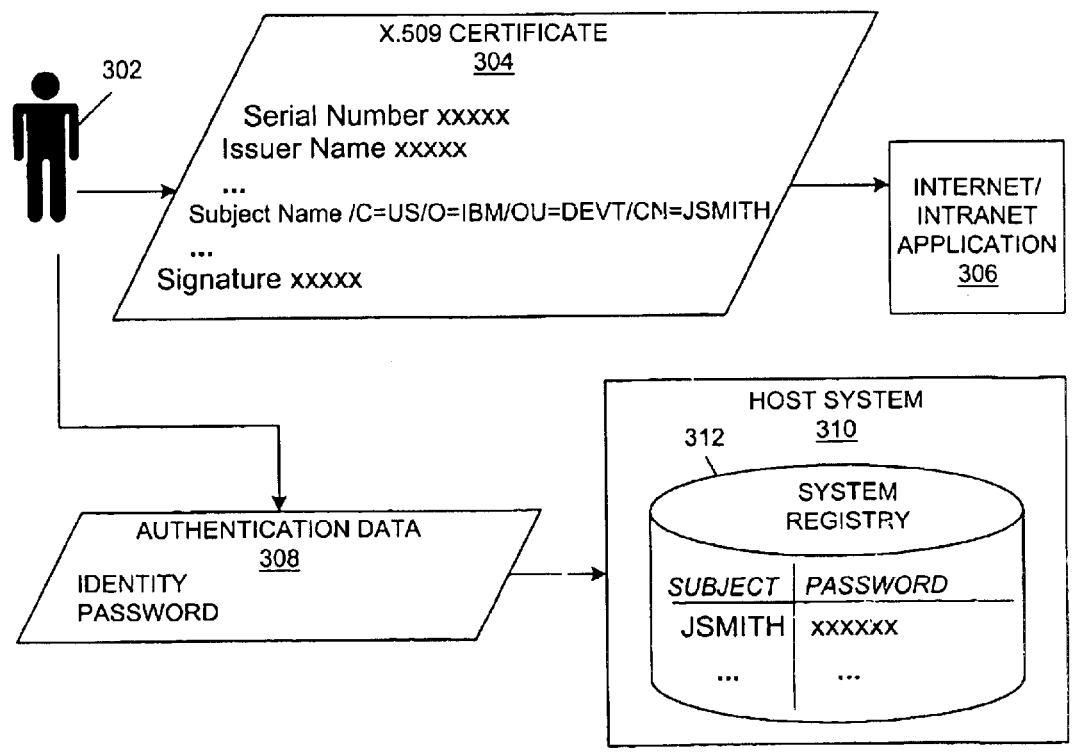
FIG. 3 depicts an entity that may be authenticated to different systems or applications in different manners.

With reference now to FIG. 3, a block diagram depicts an individual that may be authenticated to different systems or applications in different manners. FIG. 3 reflects the inefficiency in maintaining user identities in different manners on different systems.

User 302 possesses X.509 digital certificate 304, which is transmitted to an Internet or intranet application 306 that comprises X.509 functionality for processing and using digital certificates. The entity that receives certificate 304 may be an application, a system, a subsystem, etc. Certificate 304 contains a subject name or subject identifier that identifies user 302 to application 306, which may perform some type of service for user 302.

User 302 may authenticate to other systems by sending authentication data 308 comprising identity information and some type of secret information, such as a password. Host system 310 receives authentication data 308, which can be reconciled with identity information in system registry 312, and host system 310 may then allow user 302 to use its services and resources. Although not shown in the figure, user 302 may have other identities on other host systems, which would require multiple sets of authentication data similar to authentication data 308.

FIG. 3 shows a problem that can arise when a user has multiple identities within an enterprise—the multiple identities may be decoupled, thereby forcing the systems within the enterprise to perform different methods of authentication. The subject name within the certificate is possibly unknown to many applications running on host systems, particularly legacy applications, yet the certificate holder may have an associated identity on the host systems. Because the identities are decoupled, a host application server may be prevented from taking advantage of the reliable authentication methodology that an X.509 certificate provides at lower level authentication protocols, such as a Secure Socket Layer (SSL) stack.

Figures 4, 6:
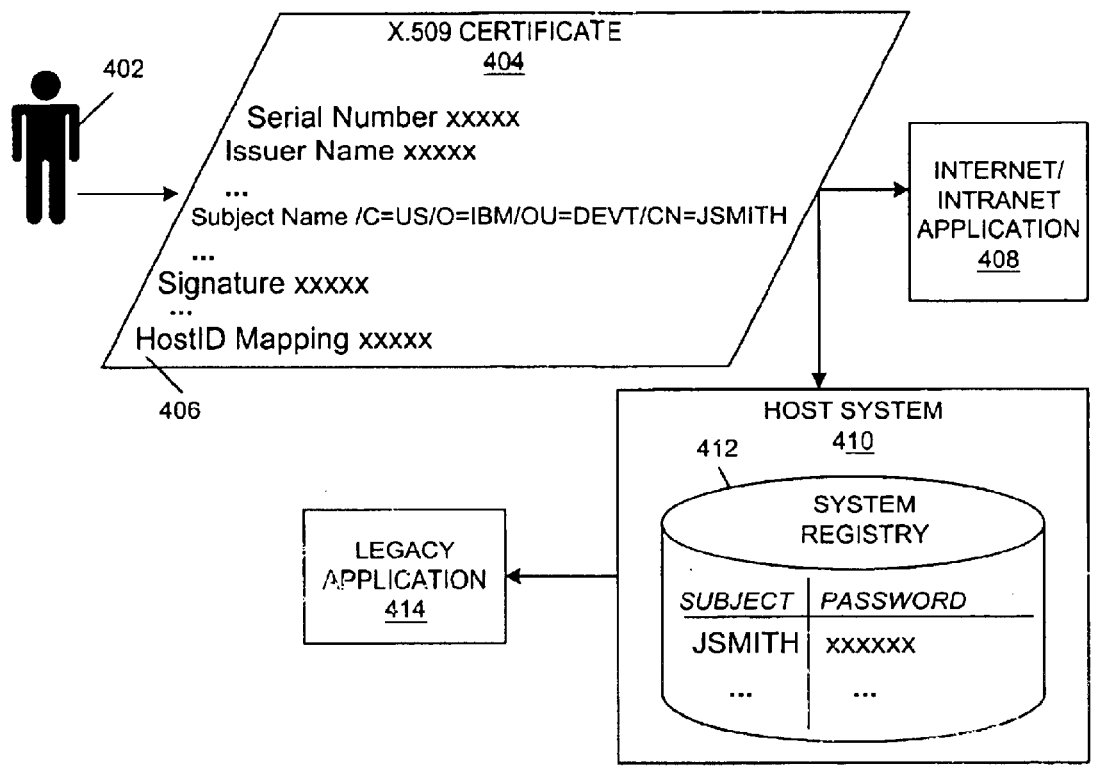
FIG. 4 shows a simplified manner of using a digital certificate for a variety of purposes in accordance with the present invention.
FIG. 6 shows the structure of a host identity mapping extension for use within an X.509 certificate in accordance with a preferred embodiment of the present invention.

With reference now to FIG. 4, a block diagram shows a simplified manner of using a digital certificate for a variety of purposes in accordance with the present invention. A more complete description of the present invention is provided with respect to FIGS. 7–8C. FIG. 4 merely provides a simple manner of observing the additional functionality provided by the present invention compared to prior art methodologies as shown in FIG. 3.

User 402 possesses X.509 certificate 404 that contains HostIDMapping 406, which is implemented as an extension within the certificate, as explained in more detail with respect to FIG. 6. User 402 can send certificate 404 to various Internet/intranet applications 408, as is typically performed in the prior art.

However, given that certificate 404 contains HostID mapping information 406, certificate 404 may also be transmitted to host system 410. Host system 410 has knowledge of various other identities of user 402 in system registry 412. Host system 410 retrieves the HostID mapping information from the certificate and obtains an identity and associated secret information so that user 402 can be authenticated to various other applications or services within host system 410, such as legacy application 414, using only the presentation of certificate 404. A separate transmittal of authentication data for legacy application 414 is not required after the user is authenticated to the host system.

With reference now to FIG. 5, some of the fields of a standard X.509 digital certificate are shown. The constructs shown in FIG. 5 are in Abstract Syntax Notation 1 (ASN.1) and are defined within the X.509 standard.

With reference now to FIG. 6, a diagram shows the structure of a host identity mapping extension for use within an X.509 certificate in accordance with a preferred embodiment of the present invention. The host identity mapping extension, shown as HostIDMapping in FIG. 6, is a construct that contains: hostName, which identifies the host on which the associated subject identifier is located; subjectID, which is the identity on the associated host that belongs to the certificate holder; and proofofIdpossession, which has the contents as shown in the IdProof construct.

The proofOfIdPossession data item is self-explanatory; it is used to prove that the certificate holder has possession of the named host identifier. The IdProof construct contains the secret information and an identifier for the encryption algorithm with which the secret data was encrypted. In other words, the subject identifier and the secret information in the host identity mapping extension serve a purpose similar to the identity and the password in authentication data 308 shown in FIG. 3.

The secret information in the IdProof construct is some type of authentication secret that should be known only to the certificate holder and the host system, which is usually a password but may be some type of biometric identification information, etc. The secret information is encrypted in a process shown in more detail in FIG. 7.

The host identity mapping is implemented as an extension as provided by the x.509 standard. It should be noted, however, that the format of the extension containing the host identity mapping information could vary from the format shown in FIG. 6. The present invention may also use other digital certificate standards or formats other than X.509 as long as the digital certificates can convey the required information. In addition, a single digital certificate may contain many host identities, which may be found within the digital certificate by searching through the host names, thereby allowing the digital certificate to support host identity mapping on multiple host systems.

The proofOfIdPossession data item within the host identity mapping information should not be confused with the proof of possession (POP) of a private key. In a public key infrastructure, in order to prevent certain attacks and to allow a certificate authority to properly check the validity of the binding between an entity and a key pair, a receiver of a digital certificate may require that an entity prove that it has possession of (or is able to use) the private key corresponding to the public key for which a certificate is requested.

Figure 7:
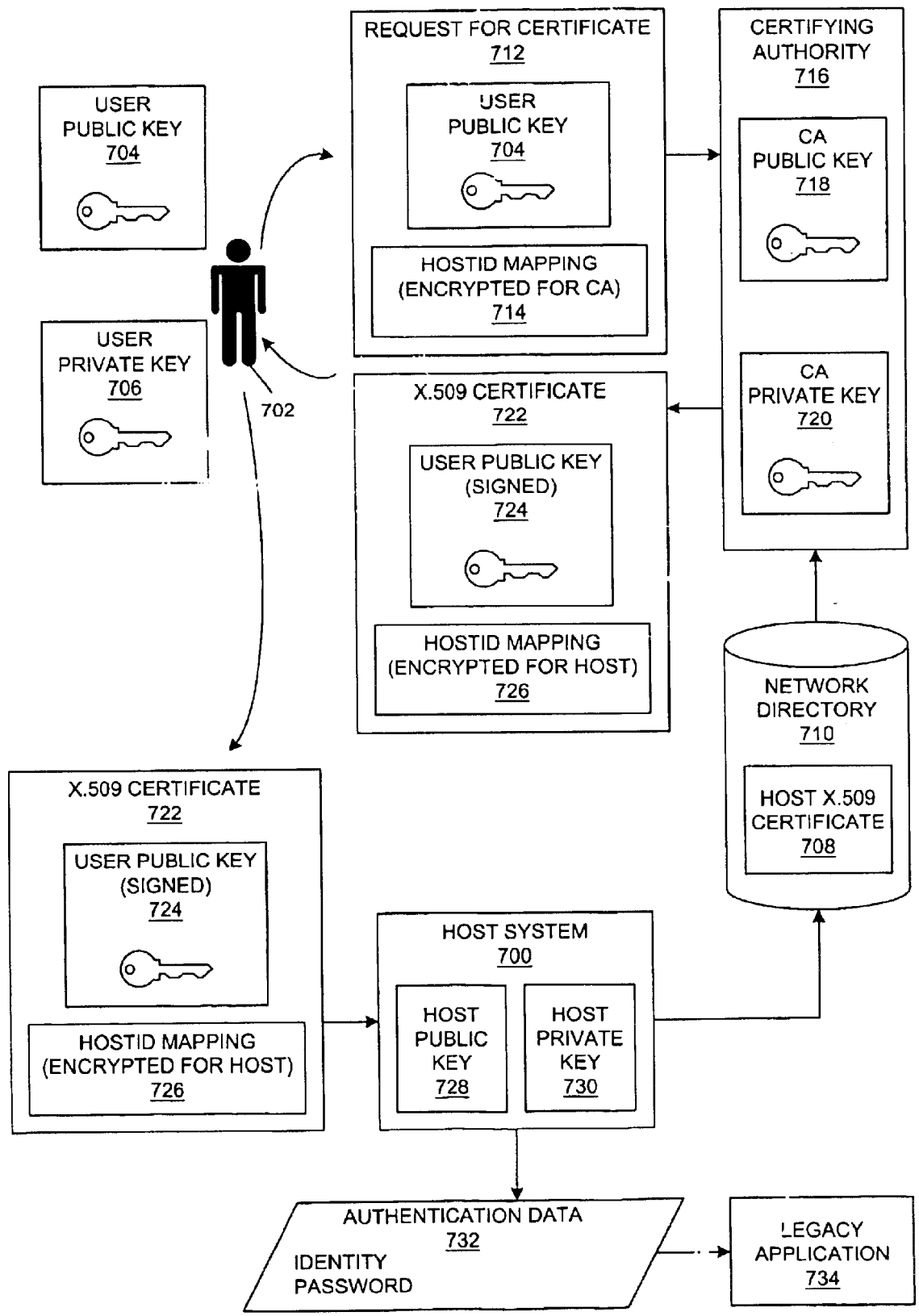
FIG. 7 depicts the use of a host identity mapping in accordance with a preferred embodiment of the present invention.

With reference now to FIG. 7, a block diagram depicts the use of a host identity mapping in accordance with a preferred embodiment of the present invention. By using the trusted relationships associated with digital certificates, the present invention is able to map the identity of the certificate holder to a host identity of the certificate holder within an application or system that does not support digital certificates. The central processing is provided by an intermediate host system, also termed the targeted host.

Host system 700 provides services for clients, such as user 702. User 702, acting as a client entity of the public key infrastructure, has previously obtained or generated a public/private key pair, e.g., user public key 704 and user private key 706. Host system 700 has previously published its certificate 708 containing its public key into network directory 710.

User 702 generates a request for certificate 712 containing encrypted host identity mapping data 714 and user public key 704. Encrypted host identity mapping data 714 is created by encrypting the password or other secret information that is associated with the identity by using the public key of certifying authority 716, which is published and available to user 702.

The encrypted host identity mapping data may also comprise other host information as necessitated by the targeted host system. The format of the host identity mapping data may also vary depending upon the purposes and needs of a particular implementation of the present invention. The encrypted host identity mapping information may be generated in a variety of manners, such as encrypting both the host identity and its associated secret information or merely encrypting the secret information. The intention is that the secret information should be encrypted to prevent illicit capture and use of the secret information. However, the host identity or other host information may not necessarily require encryption.

User 702 sends the request to certifying authority 716, which is in possession of CA public key 718 and CA private key 720.

Certifying authority 716 verifies the identity of user 702 in some manner and determines whether to issue a digital certificate for user 702. If so, then certifying authority 716 decrypts encrypted host identity mapping data 714 (so-called CA-encrypted data, i.e. encrypted for use by the CA) using CA private key 720 and encrypts the host identity mapping data with the public key of host system 700 as found in host certificate 708 stored in network directory 710, thereby generating encrypted host identity mapping data 726 (so-called host-encrypted data, i.e. encrypted for use by the host). Certifying authority 716 then creates X.509 digital certificate 722 containing signed user public key 724 that was signed with CA private key 720 and encrypted host identity mapping data 726.

User 702 receives newly generated digital certificate 722, and user 702 may then publish digital certificate 722 as necessary to engage in trusted transactions or trusted communications. An entity that receives digital certificate 722 may verify the signature of the CA by using CA public key 718, which is published and available to the verifying entity.

At some point in time after receiving the digital certificate, user 702 sends digital certificate 722 to host system 700, which is in possession of host public key 728 and host private key 730. Host system 700 retrieves encrypted host identity mapping information 726 from the received certificate and employs host private key 730 to decrypt the encrypted secret information in the host identity mapping information. The retrieved identity and the decrypted secret information are then placed into authentication data 732, which is sent to legacy application 734. If the digital certificate has multiple subject identifiers, i.e. host identities, each of the identities may have an associated password, and a single presentation of the digital certificate would allow the user to have access to applications and resources throughout the system.

Figure 8A:
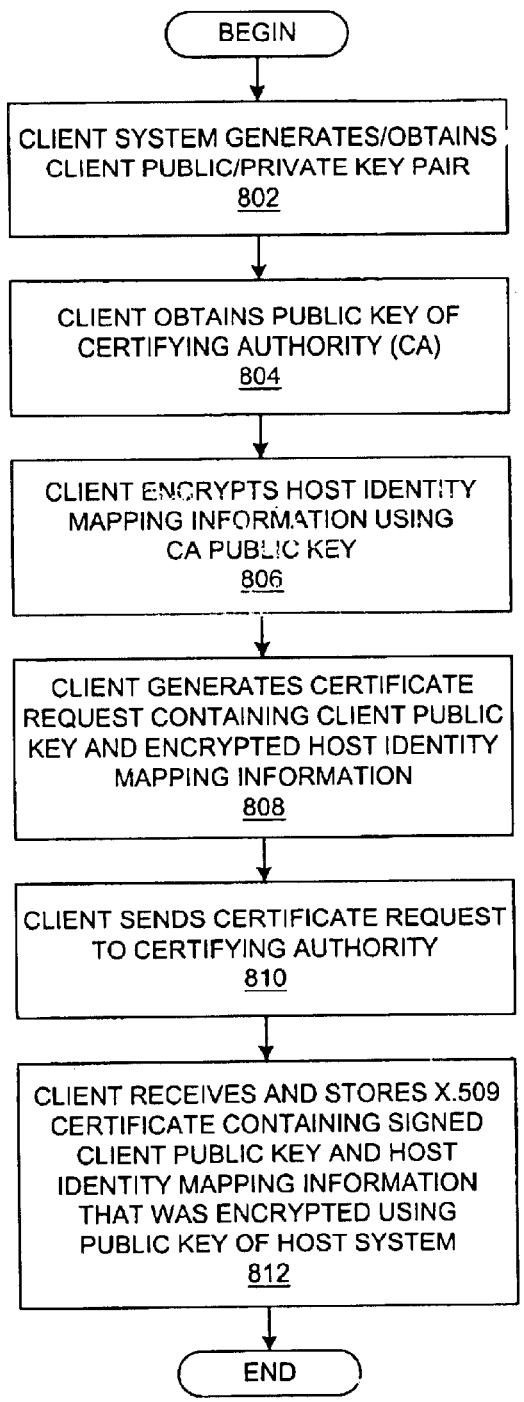
FIGS. 8A–8C are flowcharts depicting the processing of a digital certificate for authenticating a certificate holder on a system using the identity mapping methodology of the present invention.
Figure 8B:
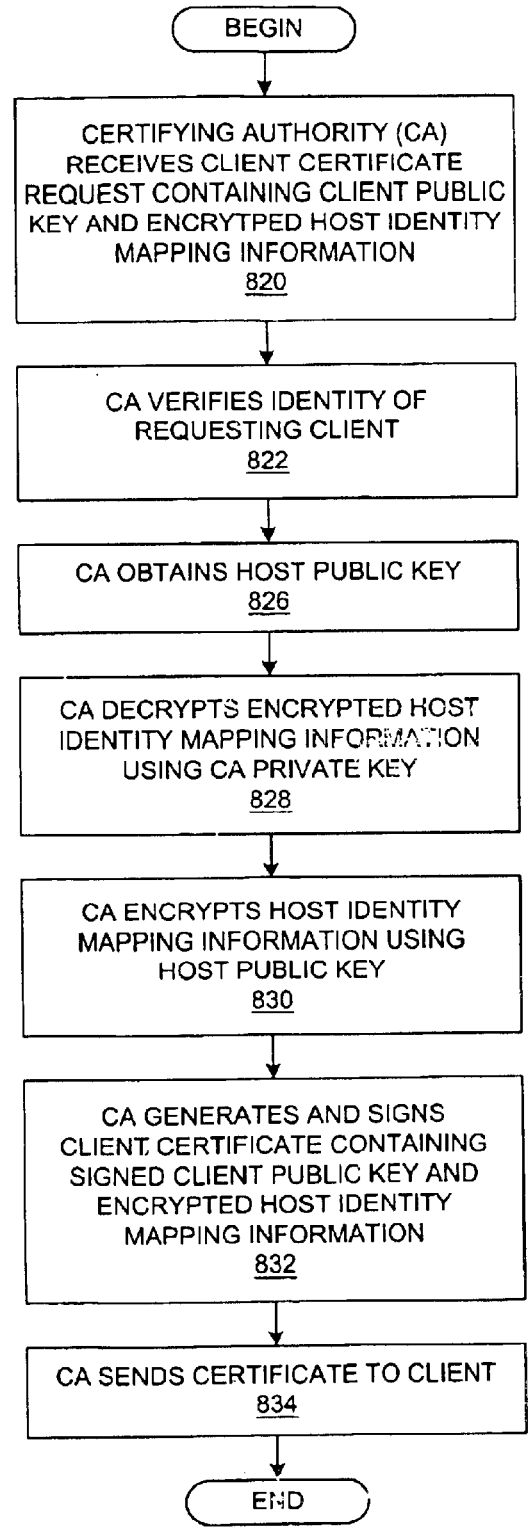
Figure 8C:
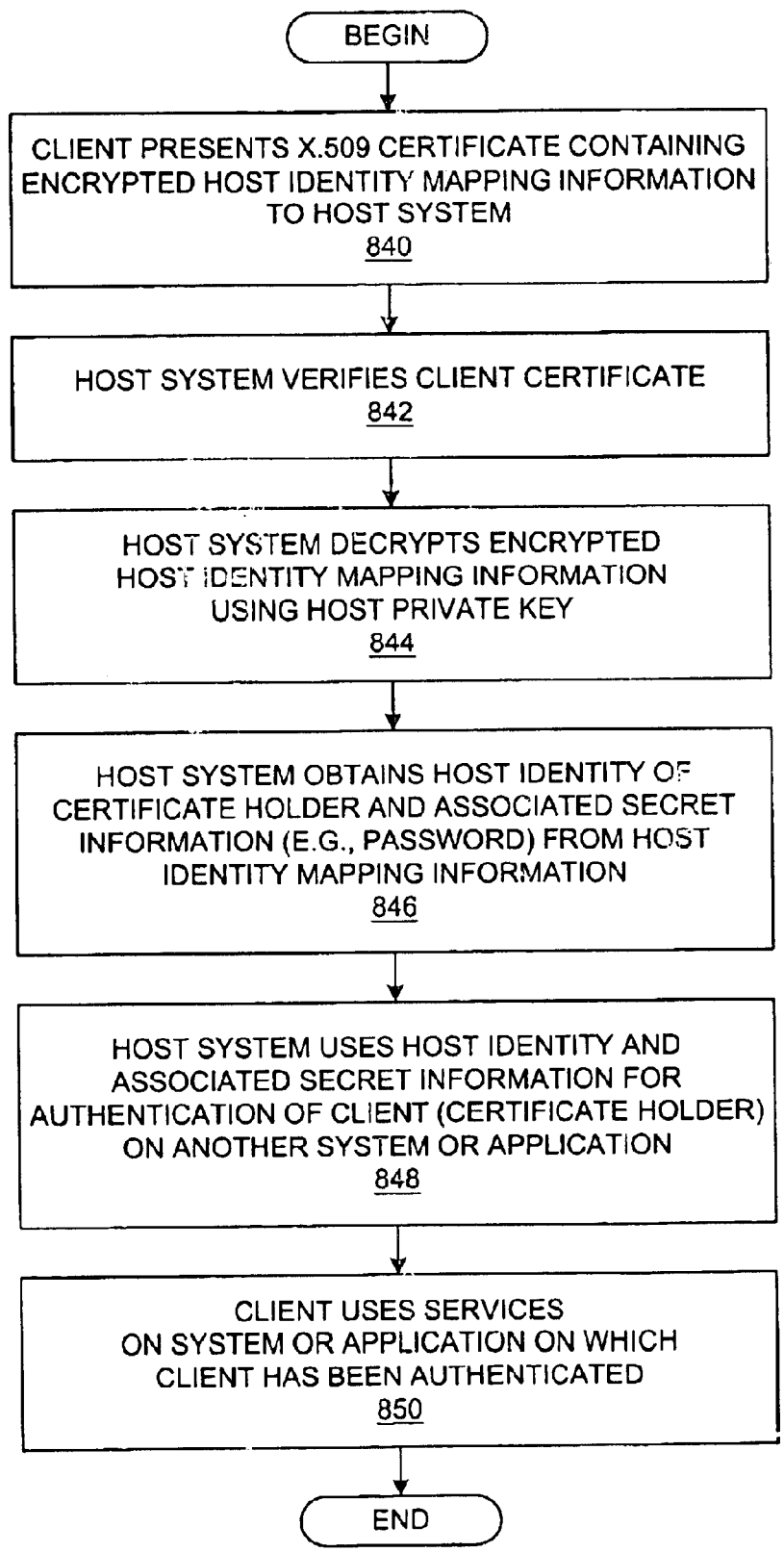

With reference now to FIGS. 8A–8C, flowcharts depict the processing of a digital certificate for authenticating a certificate holder on a system using the identity mapping methodology of the present invention. The processing begins in FIG. 8A with a client system generating or obtaining a public/private key pair (step 802). The client also obtains the public key of the certifying authority that will produce an X.509 certificate (step 804). The client possesses a host identity on a targeted host system and its associated secret information, such as a password. The client encrypts the host identity mapping information using the CA public key (step 806) and generates the certificate request containing the client public key and the encrypted host identity mapping information (step 808).

The client then sends the certificate request to the certifying authority (step 810). Assuming that the certificate request was processed successfully, the client eventually receives and stores its certificate containing its signed client public key and the host identity mapping information that was encrypted using the public key of the targeted host system (step 812). The processing is then complete for the phase of obtaining a certificate containing host identity mapping information for use within a targeted host system.

The phase of generating the certificate within the certifying authority is shown in FIG. 8B. The process begins when the certifying authority receives the certificate request from the client (step 820). The certificate request contains the public key of the client and the encrypted host identity mapping information for the client or certificate holder. The certifying authority verifies the identity of the certificate requester in some manner (step 822), and proceeds only if a certificate should be issued. At some point, the certifying authority also obtains the host public key (step 826).

The certifying authority then decrypts the host identity mapping information from the certificate request using the private key of the certifying authority (step 828). The certifying authority encrypts the host identity mapping information using the previously obtained host public key (step 830). Assuming the system is using X.509 certificates, the encrypted host identity mapping information may be stored within an X.509 certificate using the extension mechanism provided by the X.509 standard. The certifying authority generates and signs a digital certificate for the client containing the signed client public key and the encrypted host identity mapping information (step 832). The certifying authority then returns the certificate to the client (step 834), and the process of generating the certificate is complete.

The phase of using the certificate within the targeted host system is shown in FIG. 8C. The processing begins when the client or certificate holder presents its certificate to the targeted host system (step 840). The presented certificate contains encrypted host mapping information in addition to typical information that may be found within a digital certificate of this type. As noted previously, the certificate may contain multiple host identities that are to be used on multiple targeted host systems, although it might be assumed that there is a one-to-one relationship between the host identities in the certificate and the targeted host systems.

The host system then verifies the client certificate (step 842) and decrypts the encrypted host identity mapping information using the host's private key (step 844). The host system retrieves the host identity of the certificate holder and its associated secret information, e.g., a password, from the decrypted information (step 846). The host system then uses the received host identity and secret information to authenticate the certificate holder on another system, subsystem, application, server, etc. (step 848). For example, the host system may act as a proxy for the client in order to perform the authentication process, whereby the client obtains access to the other system or application without requiring the other system or application to contain digital certificate functionality (step 850). The process of authenticating the client through the targeted host system is then complete.

The advantages of the present invention should be apparent in view of the detailed description of the invention that is provided above. By using a novel extension value within a digital certificate called Proof of Identity Possession (PIP), the present invention performs an identity mapping by coupling the identity of a certificate holder of an X.509 digital certificate to its subject's identity as known to a host application server. In other words, a subject name within a certificate is mapped to a host application identity. Hence, the present invention uses the trusted relationships associated with digital certificates in order to authenticate user access for a legacy application or system, thereby authenticating users on a legacy application or system without the problems and costs of modifying a legacy application or system to include X.509 functionality.

The solution provided by this invention can be used to implement single network sign-on based on X.509 certificates. For example, a digital certificate may include many or all of a user's enterprise-wide identities. A user can perform a secure, sign-on operation during which the digital certificate is presented. Once the user has been authenticated within a distributed data processing system, though, the distributed data processing system can authenticate the user within systems, subsystems, and applications within the distributed data processing system. The user may then access all applications or systems in which the user has an assigned identity within the distributed data processing system. Thus, an enterprise maintains desired security requirements while receiving the benefits of the latest public key infrastructure technology.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for authenticating a client within a distributed data processing system, the method comprising the steps of:

receiving a digital certificate from the client at a host within the distributed data processing system;

obtaining a host identity for the client from the digital certificate, wherein the host identity for the client identifies the client to the host, and wherein the host is not a certifying authority that issued the digital certificate;

retrieving host-decryptable secret data associated with the host identity from the digital certificate;

decrypting the host-decryptable secret data with a host private key to generate secret data; and authenticating the client at the host using the host identity and the secret data.

2. The method of claim 1, wherein the host acts as a proxy for the client.

3. The method of claim 1 further comprising:

verifying the received digital certificate.

4. The method of claim 1 further comprising:

generating, at the client, a request for a digital certificate comprising host identity mapping data;

sending the request for the digital certificate to a certifying authority (CA); and receiving a digital certificate comprising host identity mapping data from the certifying authority.

5. The method of claim 4 further comprising:

storing the host identity in the request for the digital certificate;

encrypting secret data associated with the host identity using a public key of the certifying authority to generate CA-decryptable secret data; and storing the CA-decryptable secret data in the request for the digital certificate, wherein the host identity and the CA-decryptable secret data comprise the host identity mapping data in the request for the digital certificate.

6. The method of claim 4 further comprising:

receiving, at the certifying authority, the request for a digital certificate;

generating the digital certificate in response to the received request for the digital certificate; and sending the generated digital certificate to the client.

7. The method of claim 4 further comprising:

retrieving CA-decryptable secret data from the host identity mapping data in the request for the digital certificate;

decrypting the CA-decryptable secret data associated with the host identity using a private key of the certifying authority to generate secret data;

encrypting the secret data associated with the host identity using a public key of the host to generate the host-decryptable secret data; and storing the host-decryptable secret data in the digital certificate, wherein the host identity and the host-decryptable secret data comprise the host identity mapping data in the digital certificate.

8. The method of claim 1 wherein the digital certificate comprises multiple host identities for multiple hosts within the distributed data processing system.

9. The method of claim 1 wherein the digital certificate is formatted according to the X.509 standard.

10. The method of claim 9 wherein the host identity and the host-decryptable secret data associated with the host identity is stored within an X.509 extension within the digital certificate.

11. The method of claim 1 further comprising:

performing multiple authentication processes within the distributed data processing system for the client through the host using information within the digital certificate.

12. A method for generating a digital certificate, the method comprising the steps of:

receiving, at a certifying authority (CA), a request for a digital certificate from a client, wherein the request for a digital certificate comprises host identity mapping data, wherein a host identity for the client within the host identity mapping data identifies the client to a host, and wherein the host is not the certifying authority;

generating the digital certificate in response to the received request for a digital certificate; and sending the generated digital certificate to the client, wherein the digital certificate comprises host identity mapping data.

13. The method of claim 12 further comprising:

retrieving CA-decryptable secret data from the host identity mapping data in the request for a digital certificate;

decrypting the CA-decryptable secret data associated with a host identity using a private key of the certifying authority to generate secret data;

encrypting the secret data associated with the host identity using a public key of a host to generate a host-decryptable secret data; and storing the host-decryptable secret data in the digital certificate, wherein the host identity and the host-decryptable secret data comprise the host identity mapping data in the digital certificate.

14. An apparatus for authenticating a client within a distributed data processing system, the apparatus comprising:

first receiving means for receiving a digital certificate from the client at a host within the distributed data processing system;

obtaining means for obtaining a host identity for the client from the digital certificate, wherein the host identity for the client identifies the client to the host, and wherein the host is not a certifying authority that issued the digital certificate;

first retrieving means for retrieving host-decryptable secret data associated with the host identity from the digital certificate;

first decrypting means for decrypting the host-decryptable secret data with a host private key to generate secret data; and authenticating means for authenticating the client at the host using the host identity and the secret data.

15. The apparatus of claim 14, wherein the host acts as a proxy for the client.

16. The apparatus of claim 14 further comprising:

verifying means for verifying the received digital certificate.

17. The apparatus of claim 14 further comprising:
first generating means for generating, at the client, a request for a digital certificate comprising host identity mapping data;
first sending means for sending the request for the digital certificate to a certifying authority (CA); and
second receiving means for receiving a digital certificate comprising host identity mapping data from the certifying authority.

18. The apparatus of claim 17 further comprising:
first storing means for storing the host identity in the request for the digital certificate;
first encrypting means for encrypting secret data associated with the host identity using a public key of the certifying authority to generate CA-decryptable secret data; and
second storing means for storing the CA-decryptable secret data in the request for the digital certificate, wherein the host identity and the CA encrypted CA-decryptable secret data comprise the host identity mapping data in the request for the digital certificate.

19. The apparatus of claim 17 further comprising:
third receiving means for receiving, at the certifying authority, the request for a digital certificate;
second generating means for generating the digital certificate in response to the received request for the digital certificate; and
second sending means for sending the generated digital certificate to the client.

20. The apparatus of claim 17 further comprising:
second retrieving means for retrieving CA-decryptable secret data from the host identity mapping data in the request for the digital certificate;
second decrypting means for decrypting the CA-decryptable secret data associated with the host identity using a private key of the certifying authority to generate secret data;
second encrypting means for encrypting the secret data associated with the host identity using a public key of the host to generate the host-decryptable secret data; and
third storing means for storing the host-decryptable secret data in the digital certificate, wherein the host identity and the host-decryptable secret data comprise the host identity mapping data in the digital certificate.

21. The apparatus of claim 14 wherein the digital certificate comprises multiple host identities for multiple hosts within the distributed data processing system.

22. The apparatus of claim 14 wherein the digital certificate is formatted according to the X.509 standard.

23. The apparatus of claim 22 wherein the host identity and the host-decryptable secret data associated with the host identity is stored within an X.509 extension within the digital certificate.

24. The apparatus of claim 14 further comprising:
performing means for performing multiple authentication processes within the distributed data processing system for the client through the host using information within the digital certificate.

25. An apparatus for generating a digital certificate, the apparatus comprising:
receiving means for receiving, at a certifying authority (CA), a request for a digital certificate from a client, wherein the request for a digital certificate comprises host identity mapping data, wherein a host identity for the client within the host identity mapping data identifies the client to a host, and wherein the host is not the certifying authority;
generating means for generating the digital certificate in response to the received request for a digital certificate; and
sending means for sending the generated digital certificate to the client, wherein the digital certificate comprises host identity mapping data.

26. The apparatus of claim 25 further comprising:
retrieving means for retrieving CA-decryptable secret data from the host identity mapping data in the request for a digital certificate;
decrypting means for decrypting the CA-decryptable secret data associated with a host identity using a private key of the certifying authority to generate secret data;
encrypting means for encrypting the secret data associated with the host identity using a public key of a host to generate host-decryptable secret data; and
storing means for storing the host-decryptable secret data in the digital certificate, wherein the host identity and the host-decryptable secret data comprise the host identity mapping data in the digital certificate.

27. A computer program product on a computer readable medium for use in a distributed data processing system for authenticating a client, the computer program product comprising:
instructions for receiving a digital certificate from the client at a host within the distributed data processing system;
instructions for obtaining a host identity for the client from the digital certificate, wherein the host identity for the client identifies the client to the host, and wherein the host is not a certifying authority that issued the digital certificate;
instructions for retrieving host-decryptable secret data associated with the host identity from the digital certificate;
instructions for decrypting the host-decryptable secret data with a host private key to generate secret data; and
instructions for authenticating the client at the host using the host identity and the data.

28. The computer program product of claim 27, wherein the host acts as a proxy for the client.

29. The computer program product of claim 27 further comprising:
instructions for verifying the received digital certificate.

30. The computer program product of claim 27 further comprising:
instructions for generating, at the client, a request for a digital certificate comprising host identity mapping data;
instructions for sending the request for the digital certificate to a certifying authority (CA); and
instructions for receiving a digital certificate comprising host identity mapping data from the certifying authority.

31. The computer program product of claim 30 further comprising:
instructions for storing the host identity in the request for the digital certificate;
instructions for encrypting secret data associated with the host identity using a public key of the certifying authority to generate CA-decryptable secret data; and instructions for storing the CA-decryptable secret data in the request for the digital certificate, wherein the host identity and the CA-decryptable secret data comprise the host identity mapping data in the request for the digital certificate.

32. The computer program product of claim 30 further comprising:

instructions for receiving, at the certifying authority, the request for a digital certificate;

instructions for generating the digital certificate in response to the received request for the digital certificate; and instructions for sending the generated digital certificate to the client.

33. The computer program product of claim 30 further comprising:

instructions for retrieving CA-decryptable secret data from the host identity mapping data in the request for the digital certificate;

instructions for decrypting the CA-decryptable secret data associated with the host identity using a private key of the certifying authority to generate secret data;

instructions for encrypting the secret data associated with the host identity using a public key of the host to generate the host-decryptable secret data; and instructions for storing the host-decryptable secret data in the digital certificate, wherein the host identity and the host-decryptable secret data comprise the host identity mapping data in the digital certificate.

34. The computer program product of claim 27 wherein the digital certificate comprises multiple host identities for multiple hosts within the distributed data processing system.

35. The computer program product of claim 27 wherein the digital certificate is formatted according to the X.509 standard.

36. The computer program product of claim 35 wherein the host identity and the host-decryptable secret data associated with the host identity is stored within an X.509 extension within the digital certificate.

37. The computer program product of claim 27 further comprising:

instructions for performing multiple authentication processes within the distributed data processing system for the client through the host using information within the digital certificate.

38. A computer program product on a computer readable medium for use in a distributed data processing system for generating a digital certificate, the computer program product comprising:

instructions for receiving, at a certifying authority (CA), a request for a digital certificate from a client, wherein the request for a digital certificate comprises host identity mapping data, wherein a host identity for the client within the host identity mapping data identifies the client to a host, and wherein the host is not the certifying authority;

instructions for generating the digital certificate in response to the received request for a digital certificate; and instructions for sending the generated digital certificate to the client, wherein the digital certificate comprises host identity mapping data.

39. The computer program product of claim 38 further comprising:

instructions for retrieving CA-decryptable secret data from the host identity mapping data in the request for a digital certificate;

instructions for decrypting the CA-decryptable secret data associated with a host identity using a private key of the certifying authority to generate secret data;

instructions for encrypting the secret data associated with the host identity using a public key of a host to generate host-decryptable secret data; and instructions for storing the host-decryptable secret data in the digital certificate, wherein the host identity and the host-decryptable secret data comprise the host identity mapping data in the digital certificate.

40. A data structure representing a digital certificate for use in a data processing system, the data structure comprising:

an issuer name;

a signature;

a subject name; and an extension, wherein the extension comprises a host identity and host-decryptable secret data associated with the host identity, wherein the host identity identifies a client to a host, wherein the host is not a certifying authority that issued the digital certificate, and wherein the host-decryptable secret data is used by the host to authenticate the client.

* * * * *